J. D. BANKS.
STEAM TRAP VALVE.
APPLICATION FILED MAY 29, 1916.

1,208,726.

Patented Dec. 19, 1916.
3 SHEETS—SHEET 1.

Inventor
John D. Banks.
By Joshua R. H. Potts.
His Attorney

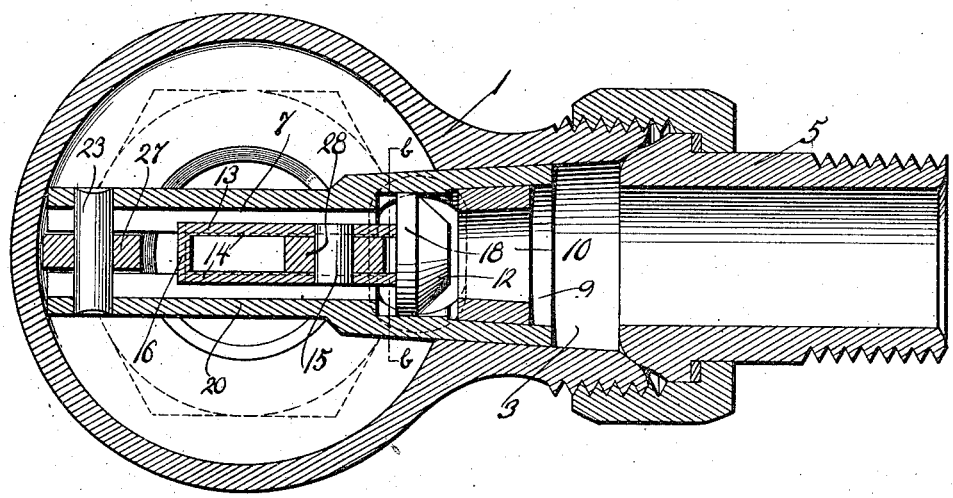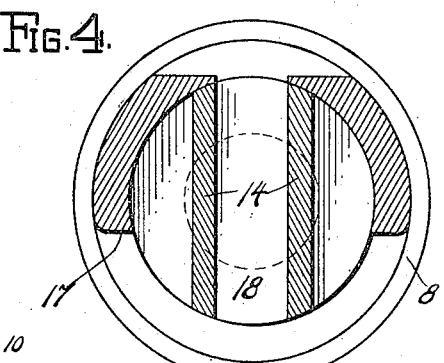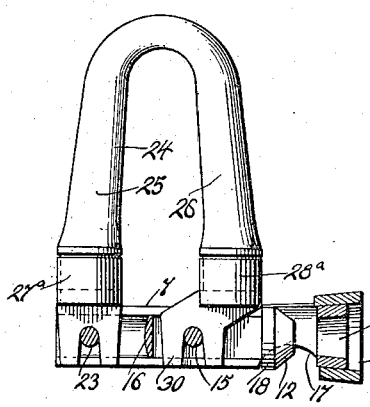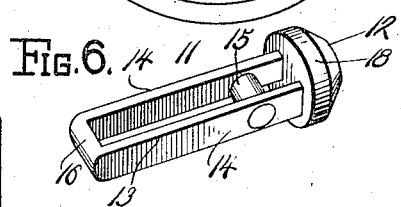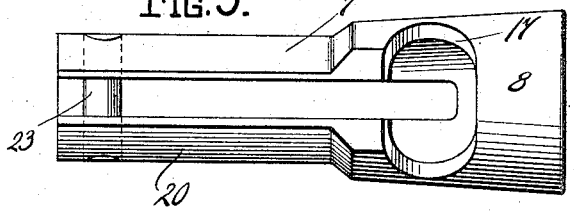

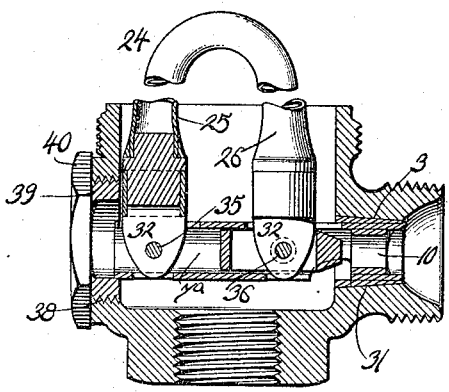
Fig. 8.
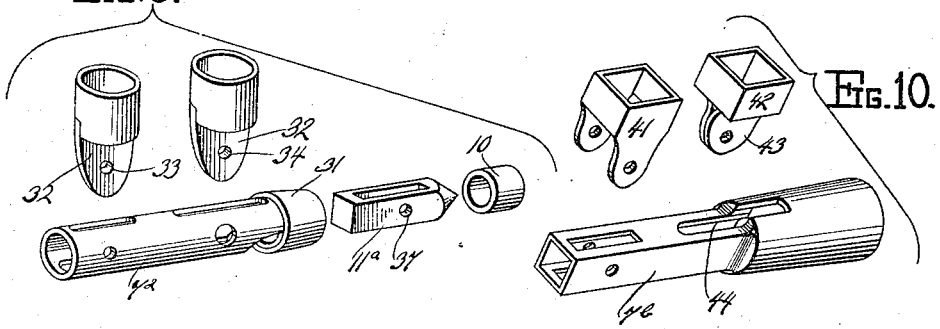
Fig. 9. Fig. 10.
Fig. 11. 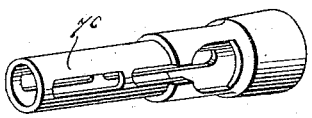 Fig. 12. 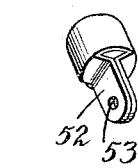 Fig. 13. 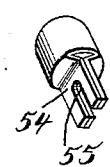
Fig. 16. 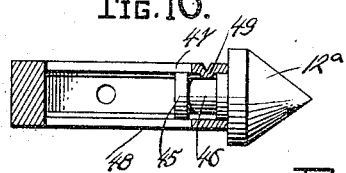 Fig. 14.

UNITED STATES PATENT OFFICE.

JOHN D. BANKS, OF COLWYN, PENNSYLVANIA.

STEAM-TRAP VALVE.

1,208,726.  Specification of Letters Patent.  Patented Dec. 19, 1916.

Application filed May 29, 1916. Serial No. 100,722.

*To all whom it may concern:*

Be it known that I, JOHN D. BANKS, a citizen of the United States, residing at Colwyn, in the county of Delaware and State of Pennsylvania, have invented certain new and useful Improvements in Steam-Trap Valves, of which the following is a specification.

My invention consists of an improved type of steam trap valve and is automatically operative by variations in the temperature of the medium surrounding certain portions of the valve.

One object of my invention is to provide a valve of the above described type which may be advantageously used as a steam trap valve for steam radiators or for any other purpose where a valve is desired to open and close due to variations in the temperature of liquids or gases.

Another object of my invention is to so construct a valve of the above described type that it may be quickly and easily manufactured and assembled, and which will not easily get out of order.

A still further object of my invention is to so construct my improved valve that the parts will operate with a minimum amount of friction and will be practically noiseless in its operation and positive in its action.

Another object of my invention is to so make my improved valve that it may be manufactured at a very small cost and that any of the parts may be easily detached for purposes of repair or substitution of new members.

These objects, and other advantageous ends which will be described hereinafter, I attain in the following manner, reference being had to the accompanying drawings in which—

Figure 1:
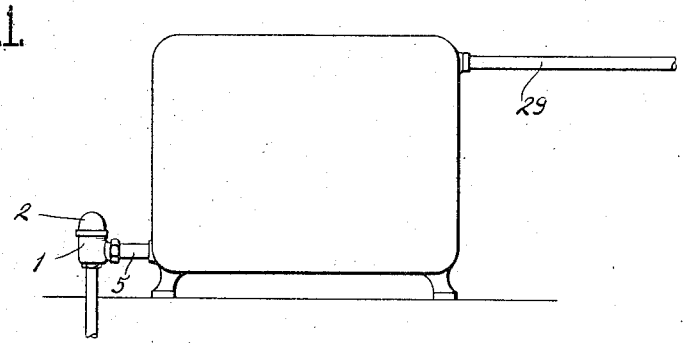
Figure 2:
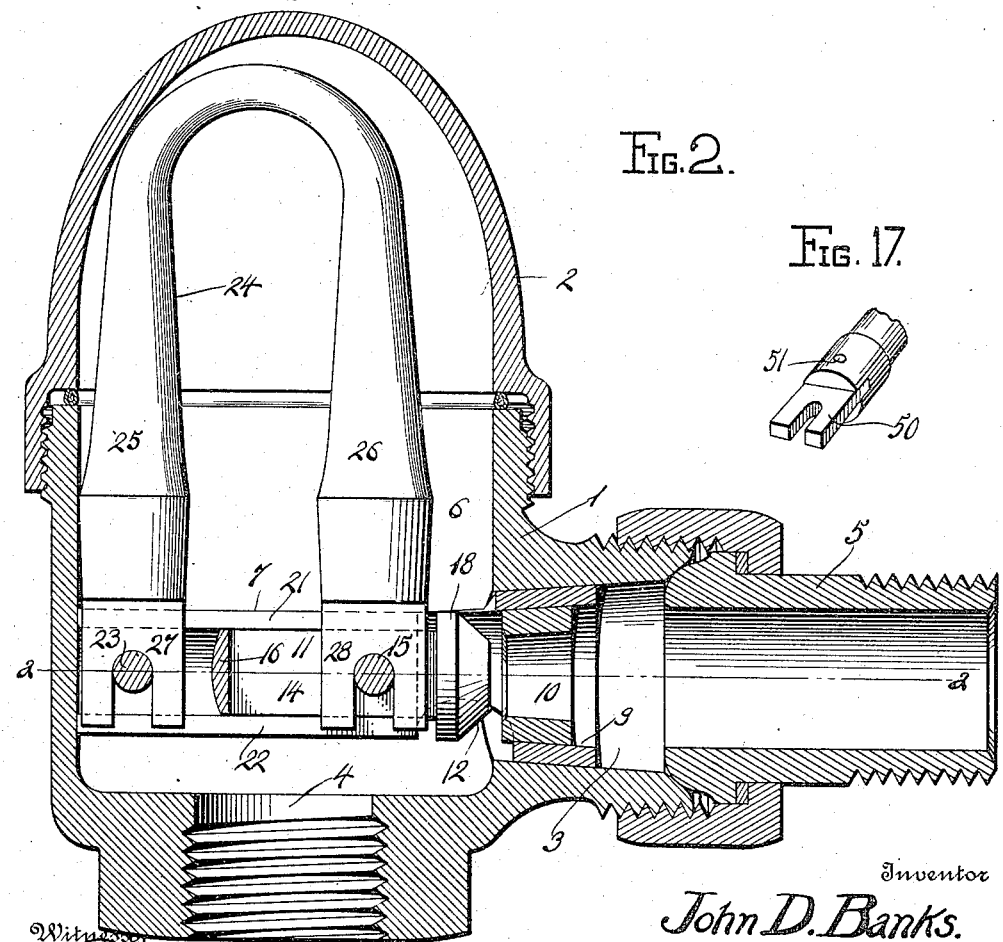
Figure 17:
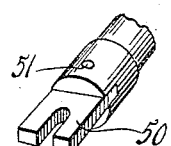
Figure 15:
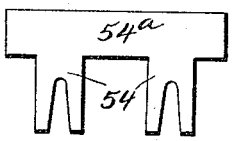

Figure 1 is an elevation of a steam radiator showing how my improved valve may be applied thereto. Fig. 2 is a sectional elevation, on an enlarged scale, of my invention. Fig. 3 is a transverse sectional view taken on the line *a—a* of Fig. 2. Fig. 4 is a cross sectional view taken on the line *b—b* of Fig. 3. Fig. 5 is an inverted plan view of the valve sleeve or casing shown in Figs. 1 to 4 inclusive. Fig. 6 is a valve designed to slide within the casing shown in Fig. 5. Fig. 7 is a sectional elevation showing an off-set end piece in combination with the members illustrated in the above mentioned figures. Fig. 8 is a transverse sectional view of a modified form of my invention, the cap of the main casing being omitted and certain of the other elements being shown in outside view and partially broken away. Figs. 9 and 10 are detached perspective views showing modified forms of my invention. Fig. 11 is a perspective view showing a modified form of the sleeve shown in Fig. 5. Figs. 12, 13, and 14, are perspective views showing modified forms of one of the elements of my invention. Fig. 15 is a modified form of one of the elements of my invention developed in a flat plane and showing how the same may be made of a piece of sheet metal or the like. Fig. 16 is a view partly in section of a modified form of valve which I in some instances employ. Fig. 17 is a fragmentary perspective view of another form of one of the elements of my invention.

Referring to the drawings, 1 is a main casing or housing having a hood 2 screwed thereon, and an inlet passage 3 and an outlet passage 4. Communicating with the inlet passage 3 is a coupling 5 which may be secured to the bottom of the steam radiator as shown in Fig. 1, or this pipe may be attached to any device in which there is an outlet passage for the conduction of heated gas or liquid. However, for the purpose of a clear description, I will hereinafter describe my valve as being attached to the steam radiator as shown in Fig. 1.

The inlet passage 3 tapers inwardly toward the chamber 6 which is provided by the housing 1 and hood 2. A valve casing 7 has a tapered end 8 which is frusto-conical in form and hollow. The degree of taper of the end 8 is substantially the same as that of the inlet 3, so that when said valve casing 7 is inserted through the opening 3, the tapered end 8 will engage the tapered passage 3, and by applying a slight force in the insertion of this casing 7, it may be securely held in contact with the wall forming said passage 3 and retained in the position clearly shown in Fig. 2 of the drawing. The inner surface 9 of the end 8 is also tapered inwardly for the reception of a ring 10 which is forced within the end 8, and forms a seat for a valve 11 (see Fig. 6). This valve 11 has a frusto-conical head 12 and a stem 13, the latter having legs 14 spaced apart and a rod 15 spanning said legs and spaced at a distance from the head 12, a transverse portion 16 serving to connect the legs 14 at their outer end.

The valve casing 7 has a large opening 17 in its bottom, this opening being in communication with the inlet passage 3 when the valve head 12 is out of contact with the valve seat on the ring 10. The valve head 12 has a cylindrical portion 18 which fits within an annular opening 19 in the casing 7, so that the valve may freely slide therein without lateral vibration.

The body portion 20 of the casing 7 is slotted at 21 on its top, and 22 on its bottom, and a pivot pin 23 extends through said body portion and extends transversely to a plane which passes through the slots 21 and 22.

A U-shaped tube 24 is made of metal and may be filled with ether or other material which would aid, due to heat variation, to cause its legs 25 and 26 to move apart. The leg 25 is provided with a forked end 27 which is designed to be slipped through the slot 21 and over the pivot pin 23. The other leg 26 is also provided with a forked end 28 which is designed to be slipped through the slot 21 and over the rod 15. It will therefore be noted that any movement of the legs 25 and 26 will effect a relative movement between the valve 11 and the casing 7, and since the casing 7 is fixed within the housing as above described, the valve will be moved toward or from the valve seat ring 10 due to the movement of the leg 26 toward or from the leg 25, it being of course understood that the said leg 25 will remain substantially stationary.

Considering that the coupling 5 is attached to the bottom of the radiator, and that the latter has a steam inlet pipe 29, the steam entering through the pipe 29 will pass directly through the radiator and into the chamber 6. This steam being at such high temperature, will cause the leg 26 of the member 24 to move the valve into engagement with the ring 10, and thereby stop the passage of steam through the inlet passage 3 and confine the steam within the body of the steam radiator until it has sufficiently given of its heat as is desired, and after the temperature in the radiator has reduced, said reduction of temperature will cause the leg 26 of the member 24 to be moved toward the leg 25 thereof and open the passage 3, allowing any condensed water therein to pass out of the passage 4.

It will therefore be understood that as the member 24 can be made to operate the valve at different predetermined temperatures, that the valve mechanism just described will automatically act to trap the steam within the radiator until it has performed its function, and will only operate when it has performed its function to open the valve.

By confining the ends 27 and 28 within the valve casing and locating them between the slots 21 and 22, the movement of the valve will be smooth and positive since there is no possible chance for the valve to become out of alinement with its seat, and this construction is a valuable feature of my invention since all rattling as is common in valves now on the market, is entirely eliminated.

As shown in Fig. 7, the ends 27ª and 28ª are made detachable with the legs 25 and 26, and the forked portion 30 of the end 28ª is off-set, so that the downward pressure on the rod 15 will not at any time be adjacent the opening 17, thereby causing any downward pressure which might occur to take place where the valve casing is fully able to resist it without causing any vibration in the action of the valve proper.

In Figs. 8 and 9, I have shown a construction where the valve casing is made from a tube, and the valve seat ring is forced within the end of the tube. The outer surface of the said end of the tube has a sleeve 31 forced thereon, and the outer surface of this sleeve is tapered to fit the tapered passage 3. Also in this form as just described, instead of having the detachable ends on the member 24 of a forked construction, they are made in the form of a tongue as shown at 32, and have openings 33 and 34. The opening 33 is designed to receive a pin 35 which extends through the valve casing 7ª, and the opening 34 is designed to receive a rod 36 which is fitted within the opening 37 of the valve 11ª. By constructing the device in this manner, it is not convenient to insert either the pin 35 or rod 36 after the valve casing has been inserted through the passage 3, so I provide a large opening 38 which is screw-threaded and receives a threaded stem 39 on a nut 40, and it will be observed that this opening 38 is sufficiently large to allow the valve casing with its several parts including the ends 32 to be inserted after which the plug 39 may be screwed into the opening 38 by means of the nut 40. In this construction it will be further noted that the taper of said passage 3 and the co-acting sleeve 31 is in a direction opposite to that shown in the above described figures.

In Fig. 10, I have shown an instance where the valve casing 7ᵇ has its body portion made of a tube which is square in cross section, and the end members 41 and 42 are made of sheet metal. In this instance, the end 41 serves to straddle the body portion 7ᵇ and a pin (not shown) serves to pivotally connect the end 41 to the body portion 7. The end portion 42 has a depending single tongue 43 which extends within a slot 44 on the top of the valve casing, and this member is designed to receive a rod, which is connected to the valve, as does the member 32 just described.

The form shown in Fig. 11 is substantially the same as the valve casing shown in Fig. 7, only that its body portion 7ᶜ is made of a cylindrical tube.

In Figs. 12, 13, and 14, I have shown certain of the detachable end portions of the member 24, and in Fig. 15 I have shown how the member illustrated in Fig. 13 appears before it is bent. In Fig. 12, the ends 52 are bent inwardly into contacting engagement with each other, each end being provided with a hole 53 through which a pin may be inserted to attach it either to the valve casing or the valve stem. Fig. 13 shows practically the same construction with the exception that the ends 54 each have a slot 55 designed to fit over a pin similar to the pin 23 or 28. In Fig. 14, the ends 56 are arranged substantially parallel with a space between them, each of the ends being provided with a hole 57. By having the ends spaced apart, they may span a construction such for example, as the valve casing shown in Fig. 10. In the development shown in Fig. 15, the ends 54 are shown integral with the body portion 54ᵃ and when formed into shape will produce the construction shown in Fig. 13.

In the valve shown in Fig. 16, the head 12ᵃ has a stem 45 which is reduced in diameter at 46, and slides between arms 47 and 48. The arm 47 has a nub 49 projecting inwardly and into the space formed by said reduced portion 46, so that the valve head 12ᵃ will have a slight longitudinal movement independent of the arms 47 and 48, but will be retained between said arms. In this construction, as in the foregoing constructions, the arms 47 will receive movement due to the relative movements of the legs 25 and 26 of the member 24. However, it will be noted that in the construction shown in Fig. 16, the head 12ᵃ may be detached from the arms by forcibly pulling the head, since there is sufficient resiliency in the arms to permit the stem to slide past the nub, so that in this construction if the valve head 12ᵃ wears, it may be readily replaced with a new one as may also be the valve seat ring 10.

In Fig. 17, I have shown the yoke member in the form of a plate 50 which is fitted within the end of the U-shaped tube and secured in place by a pin 51 so that the plate may be readily detached therefrom when the pin is removed.

While I am aware that other valves have been manufactured which are operated due to the variation of the temperature of a surrounding medium, and that U-shaped tubular members filled with ether or other material have been employed to operate valves, I am not aware of any construction of the valved casing and valve constructed and inserted in a manner hereinbefore described. Also, that the means of connection between the U-shaped member and the valve and valve casing have not been used prior to my invention.

While I have described my invention as taking one particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The combination in a thermostatic valve, of means providing a chamber and having an inlet passage and an outlet passage communicating with said chamber, a valve casing having a portion fitting within the inlet passage and another portion projecting into said chamber, a valve movable in said casing, and means within said chamber having portions movable relatively to each other due to variations in temperature, said portions being operatively attached to the valve casing and to the valve to move the latter into and out of engagement with the inlet passage to close and open the same, substantially as described.

2. The combination in a thermostatic valve, of means providing a chamber and having an inlet passage and an outlet passage communicating with said chamber, a valve casing having a portion fitting within the inlet passage and another portion projecting into said chamber, a valve movable in said casing, means within said chamber and connected to the valve casing and to the valve, said latter means being operative due to the variation of temperature within said chamber to actuate said valve to close the inlet passage, substantially as described.

3. The combination in a thermostatic valve, of means providing a chamber and having an inlet passage and an outlet passage communicating with said chamber, said inlet passage being tapered, a valve casing having a tapered portion fitting the tapered inlet passage, a valve slidable within said casing, and means within said chamber operative by variations of the temperature within the chamber and connected respectively to the valve casing and the valve to move the latter to open or close said inlet passage, substantially as described.

4. The combination in a thermostatic valve, of means providing a chamber and having an inlet passage and an outlet passage communicating with said chamber, said inlet passage being tapered, a valve casing having a tapered portion fitting the tapered inlet passage, a valve slidable within said casing, a ring fitting within said valve casing, and means within said chamber operative by variations of the temperature within the chamber and connected respectively to the valve casing and the valve to move the latter into and out of engagement with said ring to open and close said inlet passage, substantially as described.

5. The combination in a thermostatic valve, of means providing a chamber and having an inlet passage and an outlet passage communicating with said chamber, a valve casing having a portion fitting within said inlet passage and having another portion projecting into said chamber and being provided with an opening communicating with said inlet passage, a valve slidable within said valve casing, a rod carried by said valve, a pivot pin in said casing, a member within said chamber and operative due to variations in the temperature within said chamber, said member having two legs, means on said legs engaging said pin on the valve casing and said rod whereby the movement of the valve is effected to open and close said inlet passage, substantially as described.

6. The combination in a thermostatic valve, of means providing a chamber and having an inlet passage and an outlet passage communicating with said chamber, a valve casing having a portion fitting within said inlet passage and having another portion projecting into said chamber and being provided with an opening communicating with said inlet passage, a valve slidable within said valve casing, a rod carried by said valve, a pivot pin in said casing, a member within said chamber and operative due to variations in the temperature within said chamber, said member having two legs, means detachably connected to said legs engaging said pin on the valve casing and said rod whereby the movement of the valve is effected to open and close said inlet passage, substantially as described.

7. The combination in a thermostatic valve, of means providing a chamber and having a tapered inlet passage and an outlet passage communicating with said chamber, a valve casing having a portion fitting within said tapered inlet passage and provided with an opening communicating with said inlet passage, a valve slidable within said valve casing, a rod carried by said valve, a pivot pin in said casing, a member within said chamber and operative due to variations in the temperature within said chamber, said member having two legs, means on said legs engaging said pin and said rod whereby the movement of the valve is effected to open and close said inlet passage, said valve casing having a tapered portion engaging said tapered inlet passage, and a detachable valve ring seat within said casing, said valve ring seat communicating with said opening in the valve casing and with the inlet passage and being designed to be engaged by the valve to close said inlet passage, substantially as described.

8. The combination in a thermostatic valve, of a main casing providing a chamber with inlet and outlet passages communicating therewith, a valve casing having longitudinally extending slots therein, a valve slidable within said casing, a member within said chamber operative due to the variation of temperature within said casing, a pin in said valve casing extending transversely of said slots, a rod in said valve extending transversely to the slots of said valve casing, end portions on said member extending through said slots and respectively engaging the pin and the rod to effect the movement of the valve to open and close said passage, substantially as described.

9. The combination in a thermostatic valve, of a main casing providing a chamber with a tapered inlet passage and an outlet passage communicating therewith, a valve casing having longitudinally extending slots therein, a valve slidable within said casing, a member within said chamber operative due to the variation of temperature within said casing, a pin in said valve casing extending transversely of said slots, a rod in said valve extending transversely to the slots of said valve casing, end portions on said member extending through said slots and respectively engaging the pin and the rod to effect the movement of the valve to open and close said passage, and said valve casing having a tapered portion fitting the tapered inlet passage, substantially as described.

10. The combination in a thermostatic valve, of a main casing providing a chamber with a tapered inlet passage and an outlet passage communicating therewith, a valve casing having longitudinally extending slots therein, a valve slidable within said casing, a member within said chamber operative due to the variation of temperature within said casing, a pin in said valve casing extending transversely of said slots, a rod in said valve extending transversely to the slots of said valve casing, end portions on said member extending through said slots and respectively engaging the pin and the rod to effect the movement of the valve to open and close said passage, said valve casing having a tapered portion fitting the tapered inlet passage, the valve casing having a tapered inner surface and a tapered valve seat ring fitting said tapered inner surface, said valve seat ring being in communication with the inlet passage and the outlet passage and designed to be engaged by said valve to close said inlet passage, substantially as described.

11. The combination in a thermostatic valve, of a main casing providing a chamber with inlet and outlet passages communicating therewith, a valve casing having longitudinally extending slots therein, a valve slidable within said casing, a member within said chamber operative due to the variation of temperature within said casing, a pin in said valve casing extending transversely of said slots, a rod in said valve extending transversely to the slots of said valve casing, end portions on said member extending through said slots and respectively engaging the pin and the rod to effect the movement of the valve to open and close said passage, said valve having an opening in alinement with said slots in the valve casing, and said rod extending across said opening, substantially as described.

12. The combination in a thermostatic valve, of a main casing providing a chamber with inlet and outlet passages communicating therewith, a valve casing having longitudinally extending slots therein, a valve slidable within said casing, a member within said chamber operative due to the variation of temperature within said casing, a pin in said valve casing extending transversely of said slots, a rod in said valve extending transversely to the slots of said valve casing, end portions on said member extending through said slots and respectively engaging the pin and the rod to effect the movement of the valve to open and close said passage, said valve having a detachable head, a stem on said detachable head having an off-set portion, a plurality of arms, one of said arms having a nub extending into said off-set portion and providing means for permitting a longitudinal movement of said head with respect to said arms but preventing it from becoming detached from said arms, substantially as described.

In testimony whereof I have signed my name to this specification in the presence of two subscribing witnesses.

JOHN D. BANKS.

Witnesses:
  MAUD E. L. BANKS,
  CHAS. E. POTTS.

Copies of this patent may be obtained for five cents each, by addressing the "Commissioner of Patents, Washington, D. C."